United States Patent [19]

Raffaeli

[11] Patent Number: 4,554,704
[45] Date of Patent: Nov. 26, 1985

[54] CORROSION RESISTANT CASTER

[75] Inventor: Lidio P. Raffaeli, Stratford, Conn.

[73] Assignee: Stewart-Warner Corporation, Chicago, Ill.

[21] Appl. No.: 560,910

[22] Filed: Dec. 14, 1983

[51] Int. Cl.[4] .............................. B60B 33/00
[52] U.S. Cl. ...................... 16/21; 16/18 R; 16/DIG. 27; 384/300
[58] Field of Search ........ 16/18 K, 21, 385, DIG. 27; 308/DIG. 7, DIG. 8, DIG. 9; 384/300

[56] References Cited

U.S. PATENT DOCUMENTS

| 2,689,380 | 9/1954 | Tait | 384/300 X |
| 3,464,882 | 9/1960 | Morton | 384/300 X |
| 3,920,293 | 11/1975 | Takeuchi | 16/DIG. 27 X |
| 3,964,124 | 6/1976 | Crawford | 16/21 |
| 4,054,964 | 10/1977 | Kaneko | 16/20 |
| 4,076,346 | 2/1978 | McMahan, Sr. | 16/20 X |
| 4,097,954 | 7/1978 | Christensen | 16/21 |
| 4,277,118 | 7/1981 | McCloskey | 384/300 |
| 4,348,784 | 9/1982 | Fontana | 16/21 X |

Primary Examiner—Fred A. Silverberg
Attorney, Agent, or Firm—A. G. Douvas

[57] ABSTRACT

A heavy-duty caster assembly for a corrosive environment having a U-shaped metallic wheel supporting horn with a metal swivel plate rotatably mounted on the horn by a kingpin wherein both the swivel plate and the horn are coated with a permanently bonded fluorocarbon coating. The facing surfaces of the swivel plate and the horn have semi-torroidal recesses that receive a pure torroidal self-lubricating plastic bearing.

10 Claims, 6 Drawing Figures

CORROSION RESISTANT CASTER

BACKGROUND OF THE INVENTION

The present invention relates to caster assemblies, and more particularly to a heavy-duty caster having a swivel plate mounted on the upper surface of a wheel-carrying horn member. Casters of this type are used extensively in heavier load applications such as supporting work dollies, pallets and scaffolding equipment. In such heavier-load applications, an axial thrust bearing, such as a ball-bearing assembly, is provided between the swivel plate and the upper surface of the horn to reduce the frictional resistance to swiveling motion and to distribute the load evenly to the horn from the supported equipment.

In one known swivel plate type caster, the caster assembly includes an inverted generally U-shaped horn member that supports the wheel for rotation, that has an upper portion with a recess that receives large metal ball-bearings also received in a mating recess in the lower surface of a round or square swivel plate adapted to be fastened to the under portion of the article or equipment to be supported. The swivel plate is axially fixed to the upper portion of the horn member by a central pin fixed thereto that extends through the horn member and carries in some cases a secondary ball-bearing thrust member on the underside of the horn member, also including an annular array of smaller metal ball-bearings engaging the underside of the upper portion of the horn.

In many environments where heavy-duty swivel plate casters are utilized, moisture, humidity, chemically corrosive materials and liquids cause the metal parts of the caster to rust and corrode, and while some rust and corrosion on certain parts of the caster does not detract from the function of the caster, only its appearance, it is frequently found that rust and corrosion in the primary and secondary thrust bearing areas of the caster eventually leads to bearing failure from a breakdown in the integrity of the steel ball-bearings. In the food-processing industry for example, high humidity, salt and brine are frequently found in the plant environment and severely attack presently known swivel plate type casters.

Other examples of industries having corrosive chemical handling problems and chemical manufacturing and processing, agricultural chemical, pulp/paper, petrochemical, metal plating, paint and textiles.

Anti-corrosive plastic bearings have been devised in the past, but thus far have not found success in heavy load casters for two reasons. Firstly, such plastic bearings do not have high load resistance or capacity, and they frequently fail even if ball-type bearings. Moreover, ball-type plastic bearings deform under high loading and substantially retard rotational motion and hence if used on this type of caster would inhibit pivoting movement of the swivel plate on the horn.

While polytetrafluoroethylene (TEFLON) coatings have been known to inhibit corrosion of metal parts, there has never been devised insofar as I am aware, a high load non-corrosive caster bearing used with such a coating. Metal ball-bearings used with fluorocarbon coated parts would continue to fail in highly corrosive environments, and moreover would have a high frictional coefficient when used with such coatings.

It is the primary object of the present invention to provide a non-corrosive swivel type caster that ameliorates the problems noted above in the prior art.

SUMMARY OF THE PRESENT INVENTION

According to the present invention, a heavy-duty swivel plate type caster is provided, specially designed for use in a corrosive environment by coating the caster parts with a permanently bonded high-lubricity fluorocarbon polymer coating and providing two high load one piece thrust bearings having a pure torroidal shape constructed of a high-strength self-lubricating plastic.

The uninterrupted pure torroidal shape of the two bearings greatly increases their load-bearing capacity and minimizes the dynamic distortion of the ring under rotational loading by the swivel plate. This pure torroidal bearing slidably engages fluorocarbon coated semi-torroidal recesses in the horn and the swivel plate resulting in a lower frictional coefficient than previously found in either plastic or metal bearing assemblies.

The bearing's unique pure torroidal shape, while unacceptable as a replacement for metal ball-bearings in conventional applications because of increased frictional coefficients, eliminates the corrosion and failure problems associated with metal ball-bearings and provides surprisingly low frictional coefficients with fluorocarbon coated bearing retainers.

Toward these ends, the present caster assembly includes an inverted generally U-shaped horn member that supports a wheel for rotation that has a cup-shaped upper portion with a semi-torroidal recess that receives a pure torroidal self-lubricating one-piece bearing constructed of a high-lubricity plastic, such as "Delrin" 500 C.L. This bearing is also received in a mating semi-torroidal recess in the lower surface of a swivel plate adapted to be fastened to the under portion of the article or equipment to be supported. The swivel plate is axially fixed to the cup-shaped upper portion of the horn member by a central kingpin affixed thereto that extends through the horn member and carries a secondary bearing retainer on the underside of the horn member having a smaller diameter pure torroidal one-piece plastic bearing constructed of the same material as the upper torroidal bearing.

The horn swivel plate and lower bearing retainer are coated with a fluorocarbon polymer coating. Several commercially available fluorocarbon coatings have been found acceptable including "Impreglon" developed by Michiana Impreglon Center, Dowagiac, Michigan and "Everlube" developed by E/M Lubricants, Inc., West Lafayette, Indiana. The Impreglon coating is applied by increasing the porosity of the part surfaces and subjecting the part surface to a gaseous fluorocarbon mixture under high temperature and then cooling the part to solidify the coating on the surface and into the interstices of the surface. In the Everlube coating process, the fluorocarbon mixture is sprayed in liquid form on the parts and thereafter the coating is heat-cured at about 300 degrees F.

The present anti-corrosive caster has greatly increased the life cycle with a very small additional cost over presently known casters that are subject to corrosion in many industries.

DETAILED DESCRIPTION OF THE PREFERRED EMBODIMENT

Figure 1:
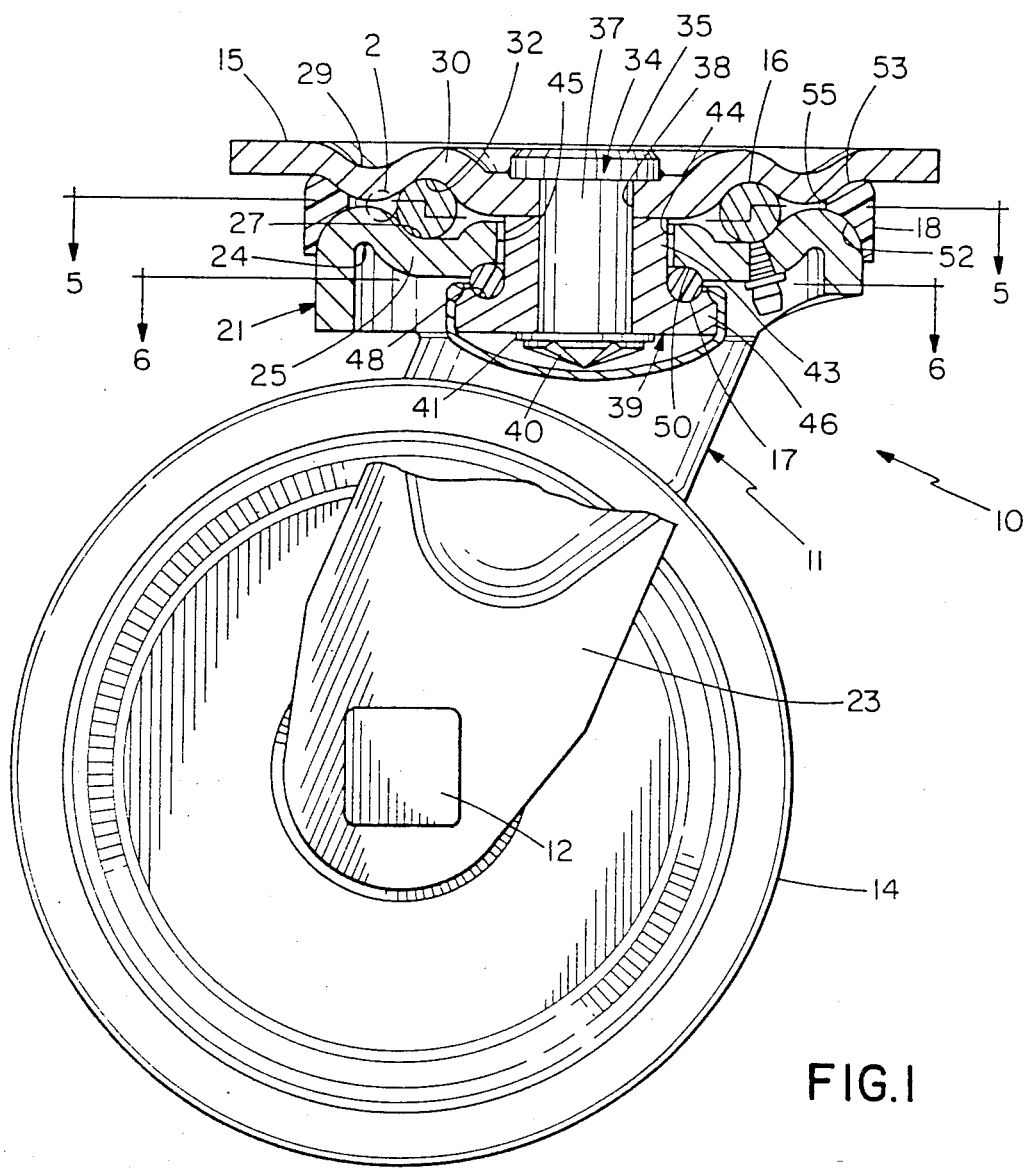
FIG. 1 is a side view, partly in longitudinal section, of a swivel plate caster according to the present invention.
Figure 2:
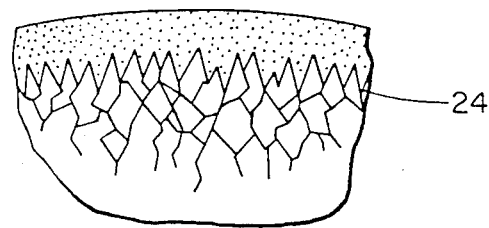
FIG. 2 is a fragmentary microscopic section of an exemplary surface of the coated caster parts taken generally in the area indicated by the dotted circle in FIG. 1.
Figure 3:
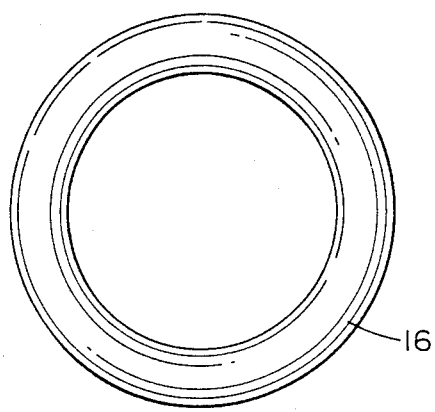
FIG. 3 is a plan view of the upper semi-torroidal bearing subassembly according to the present invention.
Figure 4:
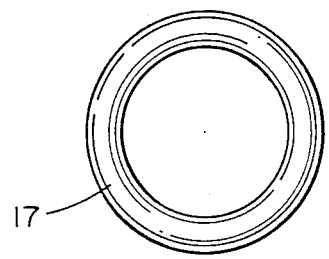
FIG. 4 is a plan view of the lower semi-torroidal bearing subassembly according to the present invention.
Figure 5:
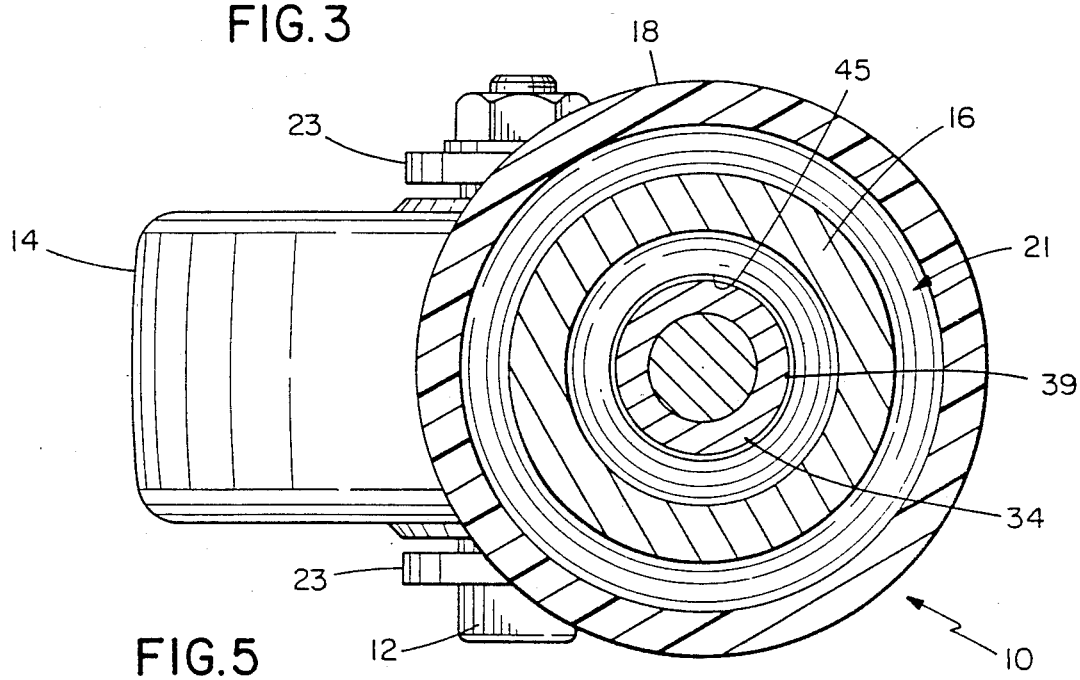
FIG. 5 is a cross-section taken generally along line 5—5 of FIG. 1 showing the upper thrust bearing assembly.
Figure 6:
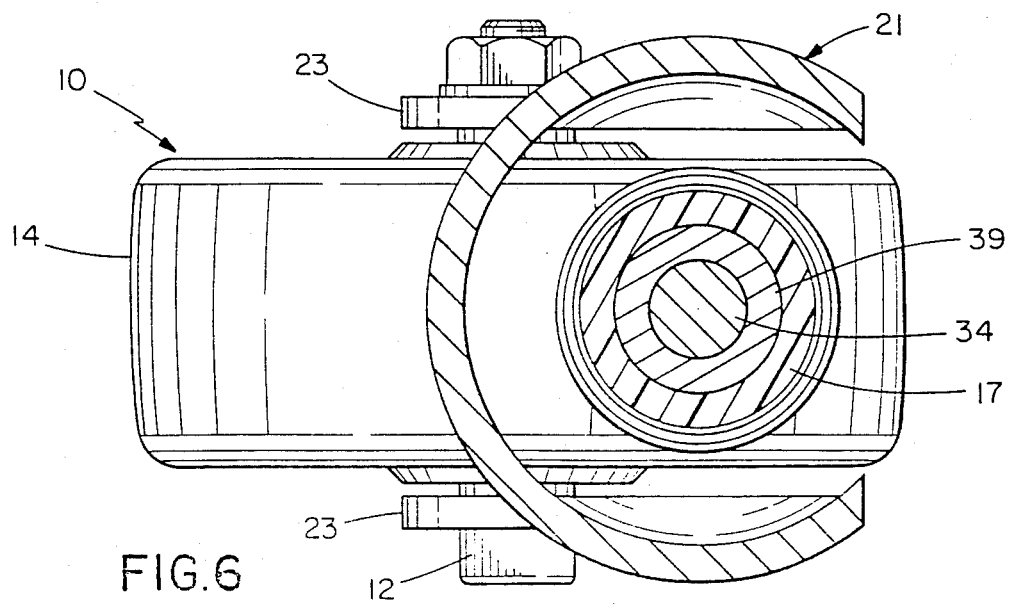
FIG. 6 is a cross-section taken generally along line 6—6 of FIG. 1 illustrating the lower thrust bearing assembly.

Viewing the drawings, a swivel plate type caster 10 is provided according to the present invention, which is seen to include an inverted generally U-shaped steel horn member 11 carrying an axle 12 that supports a wheel 14 for rotation. A metal swivel plate 15 is rotatably mounted on top of the horn with opposed pure torroidal plastic bearings 16 and 17, and the area between the swivel plate in the horn is sealed by a one-piece seal ring 18.

The horn member 11 is constructed of a heavy steel stamping that includes a cup-shaped upper portion 21 with integral spaced leg portions 23 that receive and retain the axle 12 in position. The cup-shaped portion 21 has an outer downwardly opening semi-torroidal section 24 connected to an upwardly opening inner semi-torroidal section or recess 25 that defines a semi-torroidal surface or recess 27 that receives and retains the large bearing 16 in position without the need for any separate bearing race.

The swivel plate 15 is also a heavy metal stamping that may be either circular or rectangular in outer configuration. Swivel plate 15 has an outer upwardly opening semi-torroidal portion 29 connected to a downwardly opening inner semi-torroidal portion 30 that define together a semi-torroidal recess 32, complementary to and facing the recess 27 in the horn member 11, that also receives and assists in retaining the semi-torroidal bearing 16 in position. The bearing 16 is sized to carry the entire downward load on the caster, and the swivel plate 15 remains spaced from the upper surface of the horn member 11 even under load.

The swivel plate 15 is axially fixed to the horn portion 21 by a kingpin 34 having a head 35 that is welded to the upper portion of the swivel plate 15 and has a shank portion 37 that extends through a central bore 38 in swivel plate 15, through bore 44 in horn portion 21, and through a secondary bearing member or retainer 39, mounted beneath the horn portion 21. The lower end of the kingpin 34 is deformed as indicated at 40 against the lower surface of a thrust washer 41, thereby staking the thrust washer 41, lower bearing retainer 39 and swivel plate 15 together as a unit for rotational movement on and with respect to the horn portion 21.

The secondary bearing member 39 is annular in configuration, and has an upwardly extending sleeve portion 43 that extends into central opening 44 in the horn member and is spaced from this central horn opening, leaving an annular passageway 45, permitting lubricant to flow from the area around the bearing 16 to the area of the secondary bearing 17. The bearing member 39 has an enlarged lower portion 46 that has a semi-torroidal groove or recess 48 that retains the secondary bearing 17 in position against the bearing surface 50 on the lower side of the cup-shaped portion 21 of the horn adjacent semi-torroidal portion 25 thereof. Bearing retainer 39 and bearing 17 define an axial thrust bearing to assist bearing 16 in resisting tilting loads on the caster swivel plate 15.

The seal ring 18 seals the area between the swivel plate 15 and the horn member portion 21. Ring 18 is a one-piece plastic molding and plastics found suitable for this purpose include polyethylene, vinyl or acetate copolymers. Ring 18 has a lower frusto-torroidal surface 52 that engages and seals the complementary surface on horn portion 24, and an upper frusto-torroidal surface 53 that engages and seals against the semi-torroidal surface of portion 29 on the swivel plate 15. The frusto-torroidal surfaces 52 and 53 form an annular lip 55 that fits between the swivel plate 15 and the top of the horn member portion 21 to tightly seal the area around the bearing 16, and the location provides increased sealing capability as the downward axial loads on the swivel plate 15 increase.

The wheel 14 is constructed of a one-piece plastic molding, molded of a strong impact-resistant plastic such as polypropylene. The wheel 14 also includes a central steel sleeve that may be insert molded with the surrounding polypropylene to add additional strength to the wheel. This steel sleeve (not shown) is rotatably received on axle 12.

To improve the corrosion resistivity of the present caster assembly, and also to provide an improved bearing surface for cooperation with the bearings 16 and 17, the swivel plate 15, the horn 11, the lower bearing member 39, and the thrust washer 41 are all coated entirely with a permanently bonded fluorocarbon polymer coating, such as a polytetrafluoroethylene coating. Two coatings found acceptable for this purpose are Impreglon, manufactured by Michiana Impreglon Center and Everlube, manufactured by E/M Lubricants, Inc., both cited above in the Summary of the Present Invention. The fluorocarbon coating on these parts not only resists corrosion of the metal parts but more importantly significantly reduces the coefficient of friction between the semi-torroidal plastic bearings 16 and 17 and their associated bearing seats.

The bearings 16 and 17 are each one-piece plastic moldings having a pure torroidal shape and are solid in cross-section. The bearings are molded of a high-strength, high-lubricity plastic such as "Delrin" 500 C.L. The pure torroidal configuraton of the bearings 16 and 17 provide the increased strength necessary to enable the plastic bearings to withhold the substantial thrust loads imposed on the swivel plate 15, and at the same time their uninterrupted torroidal surfaces, as opposed to interrupted ball-bearings, cooperate with their seating recesses in the horn, the swivel plate and the lower retainer 39 to reduce the coefficient of friction therebetween. Furthermore, the combined lubricity of the bearings and the fluorocarbon coatings on the recesses 27, 32, 50 and 48 further reduces the coefficient of friction of the bearings against rotational motion reducing the requirement for lubrication of the bearings and significantly increases caster life.

I claim:

1. A caster assembly specially designed for use in a corrosive environment, comprising: a metallic horn member having an upper generally horizontal supporting portion and a downwardly extending wheel support portion, a wheel rotatably mounted in the wheel support portion of the metallic horn member, a metallic swivel plate pivotally mounted on the horn member horizontal supporting portion, the horizontal supporting portion of the horn member and the swivel plate having cooperating semi-torroidal annular bearing receiving surfaces each being coated with a permanently bonded high lubricity plastic polymer, and a pure torroidal bearing ring having a constant circular cross-section and constructed of a self-lubricating plastic polymer mounted between and engaging the bearing receiving surfaces on the horn member and the swivel plate.

2. A caster assembly specially designed for use in a corrosive environment as defined in claim 1, wherein the high lubricity plastic polymer coating bonded to the receiving surfaces on the metallic swivel plate and the metal horn is a fluorocarbon polymer.

3. A caster assembly specially designed for use in a corrosive environment as defined in claim 1, wherein the plastic pure torroidal bearing ring is solid.

4. A caster assembly specially designed for use in a corrosive environment as defined in claim 1, including a swivel pin extending through the swivel plate and the horn member upper supporting portion, said swivel pin carrying an annular lower bearing retainer extending outwardly from the pin below the horn member upper supporting portion, said horn member upper supporting portion and the bearing retainer ring having facing annular semi-torroidal bearing receiving surfaces, said facing bearing receiving surfaces being coated with the permanently bonded high lubricity plastic polymer, and a pure torroidal plastic bearing ring having a constant circular cross-section and constructed of a high-lubricity plastic polymer mounted between the facing bearing receiving surfaces on the bearing retainer and the horn member.

5. A caster assembly specially designed for use in a corrosive environment as defined in claim 1, wherein the entire horn member and swivel plate are coated with a permanently bonded high-lubricity plastic polymer.

6. A caster assembly specially designed for use in a corrosive environment as defined in claim 1, including an annular seal ring around and between the swivel plate and the horn member support portion for sealing the area between the swivel plate and the horn member.

7. A caster assembly for a corrosive environment, comprising: an inverted "U" shaped metallic horn member having a generally horizontal upper supporting portion and spaced downwardly extending leg portions, a wheel rotatably supported on and between the leg portions of the horn, said upper supporting portion having an upper semi-torroidal bearing receiving surface, a swivel plate rotatably mounted on the top of the upper supporting portion of the horn member and having a lower semi-torroidal bearing receiving surface, said swivel plate and horn member having substantial portions thereof coated with a permanently bonded high lubricity plastic polymer including the semi-torroidal bearing receiving surfaces thereof which are completely coated and a pure torroidal plastic bearing having a constant circular cross-section and mounted in and between and engaging the coated bearing receiving surfaces on the horn member and the swivel plate.

8. A caster assembly for a corrosive environment, as defined in claim 7, wherein the swivel plate and horn member are entirely coated with a fluorocarbon polymer.

9. A caster assembly for a corrosive environment, comprising: an inverted U-shaped metallic horn member having a generally horizontal upper supporting portion and spaced downwardly extending leg portions, a wheel rotatably supported on and between the leg portions of the horn, said upper supporting portion having an upper semi-torroidal bearing receiving surface, a swivel plate rotatably mounted on the top of the upper supporting portion of the horn member and having a lower semi-torroidal bearing receiving surface, said swivel plate and horn member having substantial portions thereof coated with a permanently bonded high-lubricity plastic polymer including the semi-torroidal bearing receiving surfaces thereof which are completely coated, a swivel pin extending through the swivel plate and the horn member upper supporting portion, said swivel pin carrying an annular lower bearing retainer extending outwardly from the pin below the horn member upper supporting portion, said horn member upper supporting portion and the bearing retainer having facing annular semi-torroidal bearing receiving surfaces, said facing bearing receiving surfaces being completely coated with the permanently bonded high-lubricity plastic polymer, and a pure torroidal plastic bearing ring having a constant circular cross-section and constructed of a high-lubricity plastic polymer in and between and engaging the bearing receiving surfaces on the horn member and the swivel plate and also in and between and engaging the facing bearing receiving surfaces on the bearing retainer and the horn member.

10. A caster assembly for a corrosive environment, comprising: an inverted U-shaped metallic horn member having a generally horizontal upper supporting portion and spaced downwardly extending leg portions, a wheel rotatably supported on and between the leg portions of the horn, said upper supporting portion having an upper semi-torroidal bearing receiving surface, a swivel plate rotatably mounted on the top of the upper supporting portion of the horn member and having a lower semi-torroidal bearing receiving surface, a swivel pin extending through the swivel plate and the horn member upper supporting portion, said swivel pin carrying an annular lower bearing retainer extending outwardly from the pin below the horn member upper supporting portion, said horn member upper supporting portion and the bearing retainer having facing semi-torroidal annular bearing receiving surfaces, and a pure torroidal plastic bearing ring having a constant circular cross-sectioned constructed of a high-lubricity plastic polymer mounted in and between and engaging the bearing receiving surfaces on the horn member and the swivel plate and also in and between and engaging the bearing receiving surfaces on the bearing retainer and the horn member, said swivel plate and horn member and bearing retainer being entirely coated with a polytetrafluoroethylene coating.

* * * * *